(12) United States Patent
Vishwanathan et al.

(10) Patent No.: US 9,489,666 B2
(45) Date of Patent: Nov. 8, 2016

(54) METHODS AND SYSTEMS FOR PROVIDING SUBSIDIZED ACCESS TO NETWORK CONTENT

(75) Inventors: Kumar K. Vishwanathan, Acton, MA (US); Gurudutt U. Pai, North Andover, MA (US); Rangamani Sundar, Windham, NH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1231 days.

(21) Appl. No.: 13/458,362

(22) Filed: Apr. 27, 2012

(65) Prior Publication Data

US 2012/0278229 A1 Nov. 1, 2012

Related U.S. Application Data

(60) Provisional application No. 61/480,418, filed on Apr. 29, 2011, provisional application No. 61/556,887, filed on Nov. 8, 2011, provisional application No. 61/568,123, filed on Dec. 7, 2011, provisional application No. 61/602,814, filed on Feb. 24, 2012.

(51) Int. Cl.
| | |
|---|---|
| *G06F 21/00* | (2013.01) |
| *G06Q 20/14* | (2012.01) |
| *G06Q 20/12* | (2012.01) |
| *H04M 15/08* | (2006.01) |
| *H04M 15/00* | (2006.01) |

(52) U.S. Cl.
CPC ............ *G06Q 20/14* (2013.01); *G06Q 20/123* (2013.01); *H04M 15/08* (2013.01); *H04M 15/68* (2013.01); *H04M 2215/0192* (2013.01)

(58) Field of Classification Search
USPC ........................................................ 705/52
See application file for complete search history.

(56) References Cited

U.S. PATENT DOCUMENTS

| | | | | |
|---|---|---|---|---|
| 5,584,035 A | * | 12/1996 | Duggan | G06F 9/465 345/619 |
| 6,314,283 B1 | * | 11/2001 | Fielden | H04M 1/673 455/410 |
| 6,941,129 B2 | | 9/2005 | Marce et al. | |
| 8,041,341 B1 | | 10/2011 | Malackowski et al. | |
| 8,254,904 B1 | * | 8/2012 | Radoshinsky | H04M 1/72552 340/506 |
| 2004/0003383 A1 | * | 1/2004 | Chenier | G06F 8/423 717/154 |
| 2010/0031022 A1 | * | 2/2010 | Kramer | G06F 21/6218 713/155 |
| 2010/0223096 A1 | * | 9/2010 | Bosan | G06Q 30/02 705/14.64 |
| 2010/0227611 A1 | * | 9/2010 | Schmidt | H04W 76/025 455/434 |
| 2011/0295751 A1 | * | 12/2011 | Matsuo | G06Q 30/02 705/59 |
| 2012/0036051 A1 | * | 2/2012 | Sachson | G06Q 40/12 705/30 |
| 2012/0155380 A1 | * | 6/2012 | Hodges | G06Q 30/00 370/328 |

* cited by examiner

*Primary Examiner* — Zeshan Qayyum

(57) ABSTRACT

An exemplary method includes a content delivery system 1) detecting a request provided by an access device associated with a user to access network content by way of a network provided by a network service provider, the network content associated with a content provider and maintained by a content provider subsystem, 2) determining that a data usage charge for access by the user to the network content by way of the network is subsidized by the content provider in accordance with a subsidized access arrangement between the content provider and the network service provider, and 3) providing the user with subsidized access to the network content in accordance with a rule set associated with the subsidized access arrangement. Corresponding methods and systems are also disclosed.

25 Claims, 13 Drawing Sheets

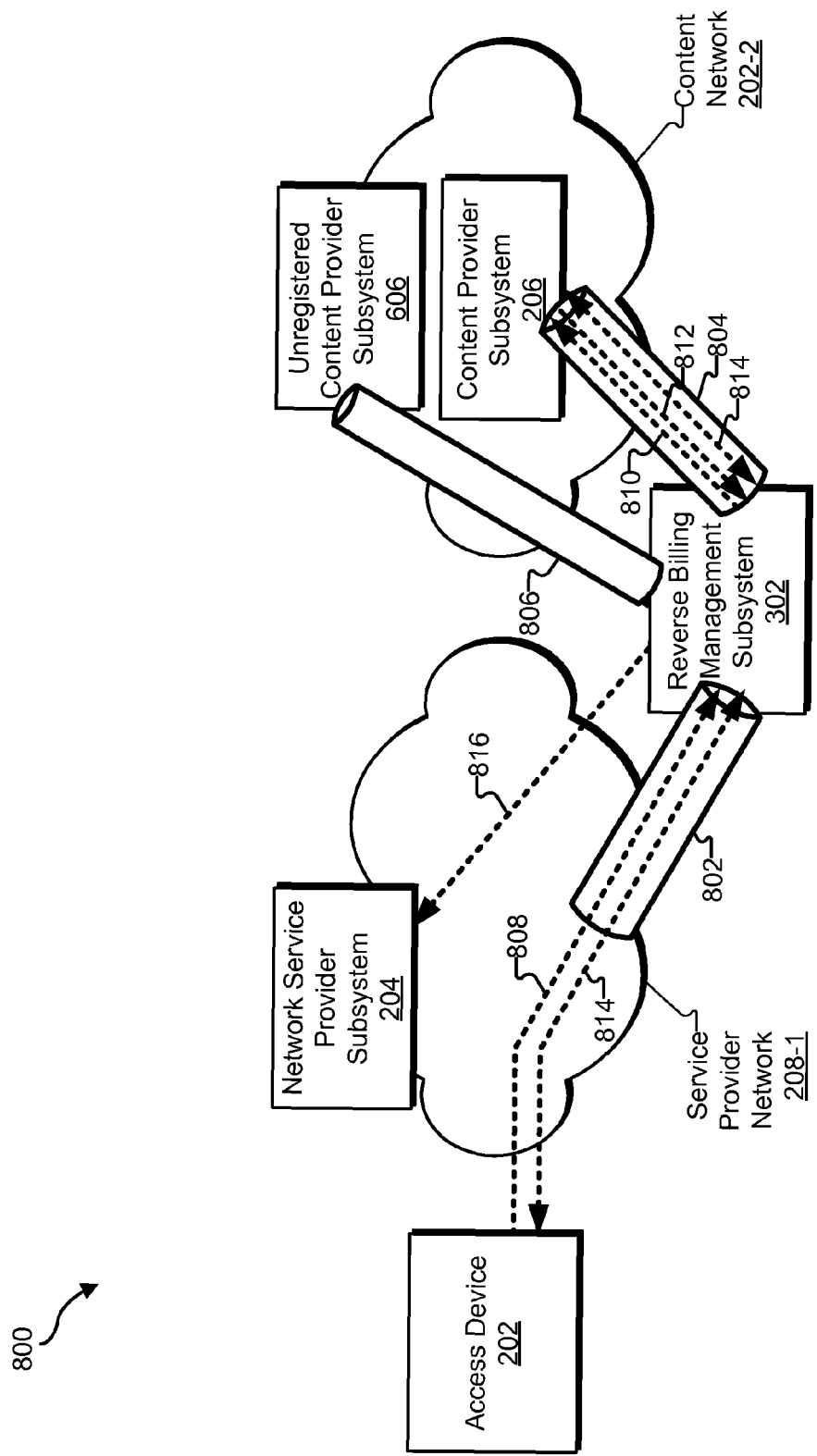

```
...
<div id="pixelcontabilizacionwebsite" class="pixelcontabilizacion"
style="position:absolute;top:0px;left:0px;width:1px;height:1px;z-Index:1">
<img src="http://pixelcounter.website.com/pixelcontabilizacion/
pixelcontabilizacion.gifctl?r=http%3A%2F%2Fwww%2website%2Ees%2Findex%2Ehtml&
amp;s=home&d=TvuRs8CoFBYAAHq9ABo" width="1" height="1" alt="" />

<!-- RBMS Auth, ID=2DFF769032A6C1E4, ACCT=1906743921, CID=345, Type=Full Site -->
<!-- img width="77px" height="15px" alt="Browsing this site will not incur data charges"
src="http: rbms.movistart.com/get?name=RBMS_full_site_img.png"
style="margin:0;padding:0;border:none;position:absolute;left:3px;top:0;"-->

</div>
...
```

Fig. 9

```
...
<div id="pixelcontabilizacionwebsite" class="pixelcontabilizacion"
style="position:absolute;top:0px;left:0px;width:1px;height:1px;z-Index:1">
<img src="http://pixelcounter.website.com/pixelcontabilizacion/
pixelcontabilizacion.gifctl?r=http%3A%2F%2Fwww%2Ewebsite%2Ees%2Findex%2Ehtml&
amp;s=home&d=TvuRs8CoFBYAAHq9ABo" width="1" height="1" alt="" />

<!-- RBMS Auth, ID=2DFF769032A6C1E4, ACCT=1906743921, CID=345, Type=Full Site -->
<img width="77px" height="15px" alt="Browsing this site will not incur data charges"
src="http:rbms.movistart.com/get?name=RBMS_full_site_img.png"
style="margin:0;padding:0;border:none;position:absolute;left:3px;top:0;">

</div>
...
```

Fig. 10

METHODS AND SYSTEMS FOR PROVIDING SUBSIDIZED ACCESS TO NETWORK CONTENT

RELATED APPLICATIONS

The present application claims priority under 35 U.S.C. §119(e) to U.S. Provisional Patent Application No. 61/480,418, filed Apr. 29, 2011, U.S. Provisional Patent Application No. 61/556,887, filed Nov. 8, 2011, U.S. Provisional Patent Application No. 61/568,123, filed Dec. 7, 2011, and U.S. Provisional Patent Application No. 61/602,814, filed Feb. 24, 2012. The contents of each of these applications are hereby incorporated by reference in their entirety.

BACKGROUND INFORMATION

Network service providers (e.g., wireless carriers, Internet service providers, etc.) often charge users to access network content by way of the providers' networks based on the amount of data that the users utilize while accessing the network content. For example, a network service provider may impose a maximum data usage amount per billing period (i.e., a data usage quota) with excess data usage being billed separately, charge a predetermined amount per unit of data usage (e.g., when a wireless device user is roaming on another wireless network), or allow a user to pre-pay for a predetermined amount of data usage.

Unfortunately, none of these billing arrangements differentiate between the types of network content accessed by a user. In other words, a user is charged in the same manner regardless of the particular website, network-based application (e.g., mobile device application or "app"), network-based service, advertisement, or other type of network content that the user accesses. As a result, many users may refrain from accessing various types of network content (e.g., certain mobile device apps, video content, advertisement content, and other potentially high-bandwidth network content) because they do not want access to such content to count against their predetermined data usage limits and/or because they do not want to pay for the data used in accessing such network content.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 8 shows an alternative configuration wherein the system of FIG. 1 is at least partially implemented by a reverse billing management subsystem according to principles described herein.

FIGS. 9-10 show an exemplary portion of source code for a webpage according to principles described herein.

DETAILED DESCRIPTION OF PREFERRED EMBODIMENTS

Figure 1:
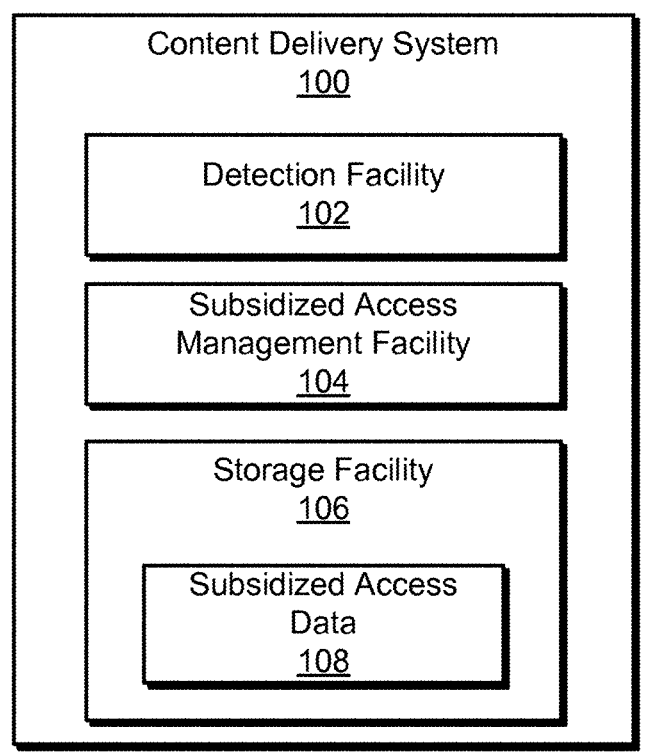
FIG. 1 illustrates an exemplary content delivery system according to principles described herein.

Methods and systems for providing subsidized access to network content are described herein. For example, as will be described below, a content delivery system may 1) detect a request provided by an access device associated with a user to access network content by way of a network provided by a network service provider, the network content associated with (e.g., provided by) a content provider and maintained by a content provider subsystem, 2) determine that a data usage charge for access by the user to the network content by way of the network is subsidized by the content provider in accordance with a subsidized access arrangement between the content provider and the network service provider, and 3) provide the user with subsidized access to the network content in accordance with a rule set associated with the subsidized access arrangement.

The methods and systems described herein may allow a content provider to subsidize access by a user to network content by way of a network associated with a particular network service provider. Subsidized access to network content may encourage or incentivize users to access the network content, thereby providing content providers and/or their network content with increased exposure, traffic, and/or revenue. Likewise, subsidized access to network content may allow users to experience and enjoy network content that they may not otherwise choose to access due to the typical data usage charges associated therewith.

As used herein, "network content" refers to any data, service, or content (e.g., Internet content) that may be accessed by way of a network. For example, network content may include, but is not limited to, a website, a network-based application (e.g., an application configured to be executed by a mobile device), a network-based service (e.g., an email service, a global positioning service ("GPS") service, a navigation service, etc.), advertisement content (e.g., web-based advertisements, banner advertisements, pop-up advertisements, etc.), media content (e.g., video and/or audio content), and/or any other type of content accessible by way of a network as may serve a particular implementation.

As used herein, a "network service provider" may include any entity configured to provide one or more network access services (e.g., wireless data access services) to a user (e.g., a subscriber). For example, a network service provider may include, but is not limited to, a wireless carrier, a wireless network provider, an Internet service provider, a subscriber television service provider, and/or any other type of provider of network access services as may serve a particular implementation.

As used herein, a "content provider" may include any entity or person associated with network content other than a network service provider. For example, a content provider may include, but is not limited to, a website owner, an application developer, an application provider, an advertisement provider, an entity (i.e., a third party entity) other than the entity that actually provides and/or maintains the network content, etc.

As used herein, a content provider may "subsidize" a data usage charge for access by a user to network content by way of a network (or "subsidize access" by the user to the network content by way of the network) in any suitable manner. For example, the content provider may pay for all or part of the data usage charge in accordance with a subsidized access arrangement between the content provider and the network service provider. In this manner, the user may access the network content for free or at a reduced cost. A data usage charge for a user may additionally or alternatively be subsidized by reducing (e.g., eliminating) an amount of data that is counted against a user's data usage quota while the user accesses the network content, refunding all or part of the data usage charge to the user, and/or upgrading a quality of service (e.g., speed) for the data used to access the network content free-of-charge to the user. Data subsidies may also be provided to the user by way of coupons, promotion codes, discounts, bundled pricing, etc. Other ways of subsidizing a data usage charge may also be used in accordance with the methods and systems described herein. For example, in some embodiments, the network service provider may subsidize the data usage charge in accordance with the methods and systems described herein.

FIG. 1 illustrates an exemplary content delivery system 100 ("system 100"). As shown, system 100 may include, without limitation, a detection facility 102, a subsidized access management facility 104, and a storage facility 106 selectively and communicatively coupled to one another. It will be recognized that although facilities 102-106 are shown to be separate facilities in FIG. 1, any of facilities 102-106 may be combined into fewer facilities, such as into a single facility, or divided into more facilities as may serve a particular implementation.

Detection facility 102 may be configured to detect a request provided by an access device (e.g., a mobile device, a computing device, etc.) associated with a user to access network content by way of a network provided by a network service provider (i.e., a "service provider network"). In some examples, the network content may be associated with (e.g., provided by) a content provider and maintained by a content provider subsystem.

Detection facility 102 may detect the request provided by the access device to access the network content in any suitable manner. For example, detection facility 102 may detect that the user has entered a universal resource locator ("URL") of the network content, selected a link (e.g., a hyperlink) associated with the network content, started a network-based application, session, or service (e.g., started an app on a mobile device), or otherwise directed the access device to request access to network content. In some examples, the request detected by detection facility 102 may include a multi-modal request (e.g., explicit requests for network content from applications such as web browsers, spoken audio commands, etc.).

Subsidized access management facility 104 may perform one or more subsidized access operations. For example, subsidized access management facility 104 may determine that a data usage charge for access by the user to the network content by way of the network is subsidized by the content provider in accordance with a subsidized access arrangement between the content provider and the network service provider. The subsidized access arrangement may include any suitable agreement, contract, and/or arrangement in which the content provider has agreed to subsidize access by one or more users to network content associated with (e.g., provided by) the content provider. To illustrate, an exemplary subsidized access arrangement may specify that a website owner has agreed to subsidize access by one or more users who access the website by way of a wireless provider's network. It will be recognized that other subsidized access arrangements between any type of content provider and network service provider may be realized in accordance with the methods and systems described herein.

Subsidized access management facility 104 may determine that the data usage charge is subsidized by the content provider in any suitable manner. For example, subsidized access management facility 104 may recognize one or more attributes of the network content and determine that the data usage charge is subsidized by the content provider based on the recognized one or more attributes. Attributes of the network content that may be identified by subsidized access management facility 104 in order to determine that the data usage charge is subsidized may include, but are not limited to, one or more network identifiers (e.g., a network address such as an internet protocol ("IF") address and/or a URL of the network content), one or more metadata values associated with the network content, one or more indicators included in packet headers and/or source code associated with the network content, and/or any other information or characteristics of the network content as may serve a particular implementation.

To illustrate, subsidized access management facility 104 may recognize that a URL of the requested network content indicates that access by the user to the network content is to be subsidized by the content provider. As an example, the user may provide a request to access a website having a URL of "http://tollfree.newspaper.com." Subsidized access management facility 104 may determine, based on the "tollfree" indicator included in this URL, that access to the website is fully subsidized by the content provider.

Additionally or alternatively, the URL of the requested network content may be included in a database of URLs to which user access is to be subsidized. For example, a content provider may register (e.g., with system 100) a particular URL (e.g., http://www.newspaper.com) for which the content provider desires to subsidize access. The URL may then be included in the database of URLs to which user access is to be subsidized. Subsidized access management facility 104 may determine that the URL of the requested network content is included in the database and thereby determine that the requested network content is subsidized by the content provider.

Additionally or alternatively, the requested network content may include one or more code snippets (i.e., data) transmitted therewith that indicates that access by the user to the network content is subsidized by the content provider. As used herein, a "code snippet" refers to a piece of code (e.g., HTML code, XML code, etc.) that may include information associated with requested network content, content provider, and/or related metadata information. For example, a code snippet may include data representative of a rule set associated with the network content, a notification associated with the network content, and/or any other type of information that may be associated with the network content. As will be described below, the code snippet may be inactive or active. An "inactive" code snippet is one that has been commented out or otherwise disabled such that its contents would normally be ignored by a computing device (e.g., an access device used by a user to access network content). An "active" code snippet is one that is enabled (e.g., not commented out) such that it may be processed by a computing device. The code snippet may be included in source code associated with (e.g., representative of) the network content (e.g., in the form of commented out code), in a packet (e.g., protocol) header or payload transmitted by the content provider to the access device, and/or in any other data associated with the network content. Examples of this will be provided in more detail below.

In some examples, subsidized access management facility 104 may determine that the data usage charge is subsidized by the content provider in response to the request being provided by the access device to access the network content. For example, a user may direct the access device to start a network-based application, select a link, access a website, or otherwise provide a request to access network content. Subsidized access management facility 104 may then determine that the data usage charge associated with accessing the network content is subsidized by the content provider.

Additionally or alternatively, subsidized access management facility 104 may determine that the data usage charge is subsidized by the content provider prior to the request being provided by the access device to access the network content. Subsidized access management facility 104 may then direct the access device to present a notification that access by the user to the network content is subsidized by the content provider. Examples of this will be provided below.

In some examples, subsidized access management facility 104 may determine that the data usage charge is subsidized by the content provider by utilizing code residing on the access device, a domain name services ("DNS") server included in a network service provider subsystem, and/or a reverse billing subsystem separate from the access device. Various examples of these implementations will be provided below.

Once subsidized access management facility 104 has determined that the data usage charge is subsidized by the content provider, subsidized access management facility 104 may provide the user with subsidized access to the network content in accordance with a rule set associated with the subsidized access arrangement.

As used herein, a "rule set" associated with a subsidized access arrangement between a content provider and a network service provider includes one or more rules that define a manner in which user access to network content by way of a network associated with the network service provider is subsidized by the content provider. For example, a rule set may include one or more rules that identify the particular network content to be subsidized, define an amount that the content provider has agreed to subsidize, and/or define a manner in which the content provider will reimburse the network service provider when a user accesses the network content. The rule set may additionally or alternatively specify one or more terms and/or conditions that have to be met in order for the content provider to subsidize user access to network content. For example, the rule set may include one or more rules specifying specific time periods (e.g., times of day, days of week, holidays, etc.) during which the content provider will subsidize user access to the network content, specific geographic or access device network address-based locations from which a user has to access the network content in order for the content provider to subsidize access by the user to the network content, specific user profile characteristics that the user has to meet in order to receive subsidized access to the network content, specific types of content (e.g., audio-based content, video-based content, Internet-based content, etc.) to which the content provider will subsidize user access, promotion codes or coupons that users may enter in order to receive subsidized access to the network content, additional network content to which the content provider will subsidize user access in exchange for accessing the network content, and/or any other condition as may serve a particular implementation.

In some examples, as will be described below, data representative of or identifying the rule set may be transmitted from the content provider to subsidized access management facility 104 together with (e.g., embedded within) data associated with (e.g., representative of) the network content. Additionally or alternatively, data representative of the rule set may be maintained by system 100 (e.g., within storage facility 106).

Subsidized access management facility 104 may provide the user with subsidized access to the network content in any suitable manner. For example, subsidized access management facility 104 may provide the user with subsidized access to the network content by tracking an amount of data transmitted between the access device and the content provider subsystem while the user accesses the network content (e.g., by counting the number of bytes of data transmitted between the access device and the content provider subsystem while the user accesses the network content) and directing the network service provider to adjust the data usage charge in accordance with the tracked amount of data and the rule set associated with the subsidized access arrangement. The tracking and directing may be performed by subsidized access management facility 104 utilizing the access device (e.g., code residing on the access device), a reverse billing subsystem, and/or in any other manner as may serve a particular implementation.

Additionally or alternatively, subsidized access management facility 104 may provide the user with subsidized access to the network content by receiving source code associated with the network content and that comprises an inactive code snippet (e.g., commented out data) representative of or identifying the rule set, identifying the rule set by analyzing the inactive code snippet, and directing the network service provider to adjust the data usage charge in accordance with the rule set. Examples of this will be provided below.

Subsidized access management facility 104 may be further configured to direct the access device to present a notification that access by the user to the network content is subsidized by the content provider. This may be performed in any suitable manner. For example, subsidized access management facility 104 may receive source code associated with the network content and that comprises an inactive code snippet (e.g., commented out data) representative of the notification, activate (e.g., uncomment) the inactive code snippet representative of the notification, and transmit the source code comprising the activated code snippet representative of the notification to the access device. The access device may then present the notification in accordance with the activated code snippet. For example, the access device may display the notification (e.g., within a webpage, within a user interface of an application, etc.).

In some examples, subsidized access management facility 104 may direct the access device to present the notification in response to the request being provided by the access device to access the network content. Additionally or alternatively, subsidized access management facility 104 may direct the access device to present the notification prior to the request being provided by the access device to access the network content.

Subsidized access management facility 104 may be further configured to provide the user with subsidized access to additional network content in accordance with the rule set associated with the subsidized access arrangement. For example, a content provider may incentivize users to access their network content by offering to subsidize access by the users to additional network content for a predetermined time period subsequent to the users accessing the network content. To this end, subsidized access management facility 104 may detect that the user has accessed the network content, track the user's data usage during the predetermined time period subsequent to the user accessing the network content, and direct the network service provider to adjust the data usage charge associated with the additional network content in accordance with a rule set provided by the content provider. As another example, a content provider may incentivize users to access their network content by offering to subsidize access by the users to specific types of additional network content subsequent to the users accessing the network content. For example, the content provider may provide the user with a free download of a song or other media content instance in exchange for accessing (e.g., viewing) an advertisement provided by the content provider.

Subsidized access management facility 104 may be further configured to authenticate at least one of the content provider subsystem, the user, and the access device. In other words, subsidized access management facility 104 may verify one or more identities, credentials, and/or permissions of the content provider subsystem, the user, and/or the access device (e.g., in order to prevent fraud). In this manner, subsidized access management facility 104 may ensure that the content provider subsystem is legitimately registered with subsidized access management facility 104 to provide subsidized access to network content and/or that the user and/or access device is authorized to receive subsidized access to the network content. Examples of authenticating a content provider subsystem will be provided in more detail below.

Storage facility 106 may be configured to maintain subsidized access data 108 generated and/or used by detection facility 102 and/or subsidized access management facility 104. For example, subsidized access data 108 may include, but is not limited to, data representative of a rule set associated with a subsidized access arrangement, tracked data usage, etc. Storage facility 106 may maintain additional or alternative data as may serve a particular implementation.

Figure 2:
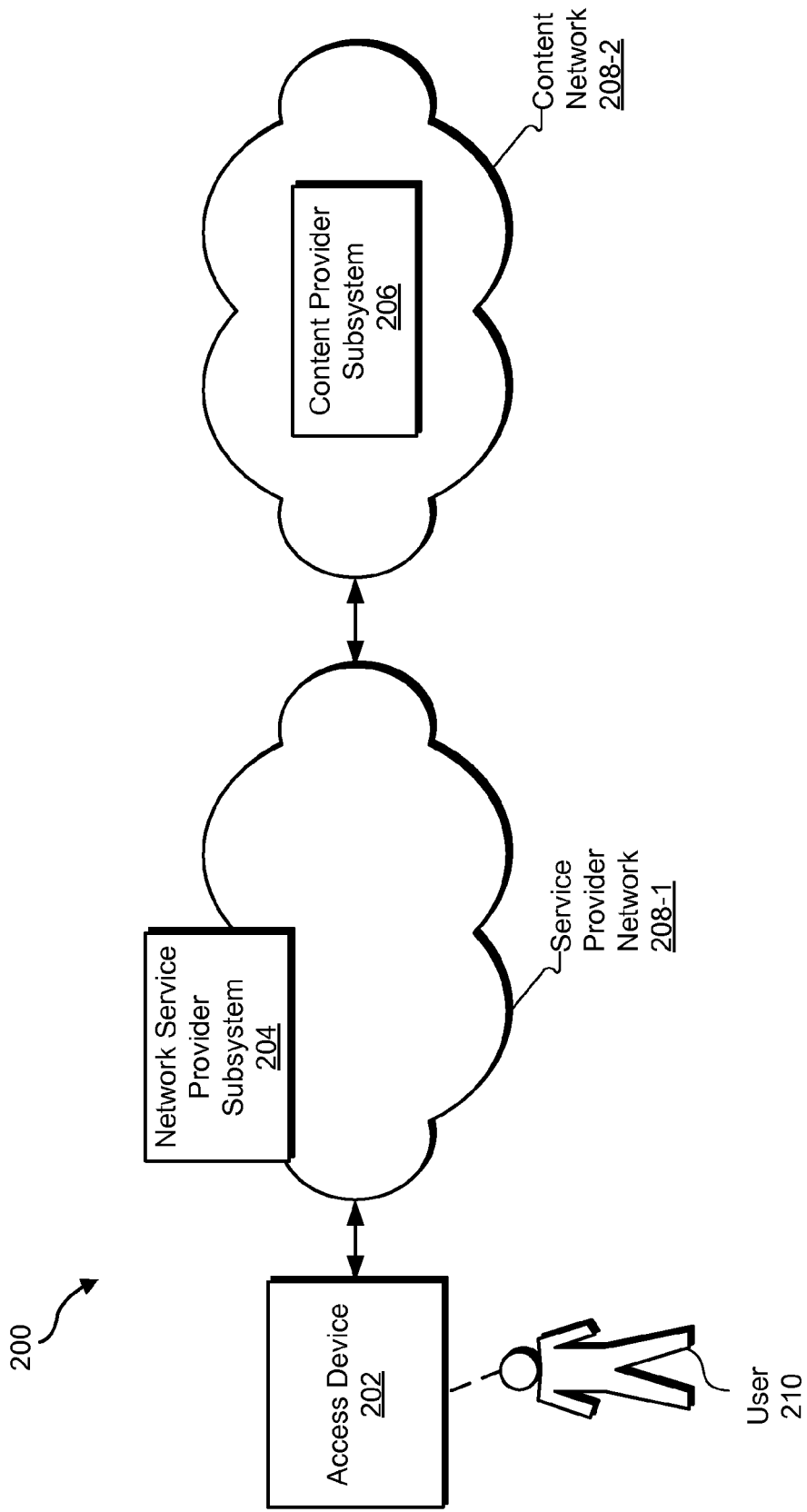
FIG. 2 illustrates an exemplary implementation of the system of FIG. 1 according to principles described herein.

FIG. 2 illustrates an exemplary implementation 200 of system 100. As shown, implementation 200 includes an access device 202, a network service provider subsystem 204, and a content provider subsystem 206. Network service provider subsystem 204 is associated with (i.e., located within) a service provider network 208-1 and content provider subsystem 206 is associated with (i.e., located within) a content network 208-2. Each of these elements will now be described in detail.

Access device 202 may be configured to facilitate access by a user 210 to network content associated with (e.g., provided by) content provider subsystem 206. To this end, as will be described below, access device 202 may communicate with content provider subsystem 206 by way of service provider network 208-1 and content network 208-2. Access device 202 may be implemented by any suitable access device, such as a mobile or wireless device (e.g., a mobile phone and/or a tablet computer), a personal computer, a set-top box device, a digital video recorder ("DVR") device, a personal-digital assistant device, a gaming device, a television device, and/or any other suitable computing device configured to access network content.

Network service provider subsystem 204 may be associated with a network service provider and may be configured to provide one or more network access services (e.g., wireless data access services) to access device 202. For example, network service provider subsystem 204 may be configured to manage (e.g., track, allow, disallow, route, etc.) network traffic (i.e., data) that flows through service provider network 208-1. To this end, network service provider subsystem 204 may be implemented by one or more gateways, routers, servers (e.g., DNS servers and/or billing management servers), and/or other network components as may serve a particular implementation.

Content provider subsystem 206 may be associated with any suitable network content provider and may be configured to provide network content that may be accessed by access device 202. Hence, content provider subsystem 206 may be implemented by any combination of computing devices (e.g., servers) as may serve a particular implementation.

Access device 202, network service provider subsystem 204, and content provider subsystem 206 may communicate with one another using any suitable communication technologies, devices, media, and protocols supportive of data communications, including, but not limited to, socket connections, Ethernet, data bus technologies, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), 4G Long Term Evolution ("LTE"), WiMax, Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

As shown, access device 202, network service provider subsystem 204, and content provider subsystem 206 may communicate by way of service provider network 208-1 and content network 208-2. Service provider network 208-1 may include any provider-specific network (e.g., a wireless carrier network or a mobile telephone network). Content network 208-1 may include a content provider-specific network, the Internet, or any other suitable network associated with content provider subsystem 206. Data may flow between service provider network 208-1 and content network 208-2 using any suitable communication technologies, devices, media, and protocols as may serve a particular implementation.

While two interconnected networks 208-1 and 208-2 (collectively "networks 208") are shown in FIG. 2, it will be recognized that networks 208 may be combined into a single network in accordance with the methods and systems described herein. Likewise, it will be recognized that access device 202 may access network content by way of more than two interconnected networks in accordance with the methods and systems described herein as may serve a particular implementation.

Figure 3:
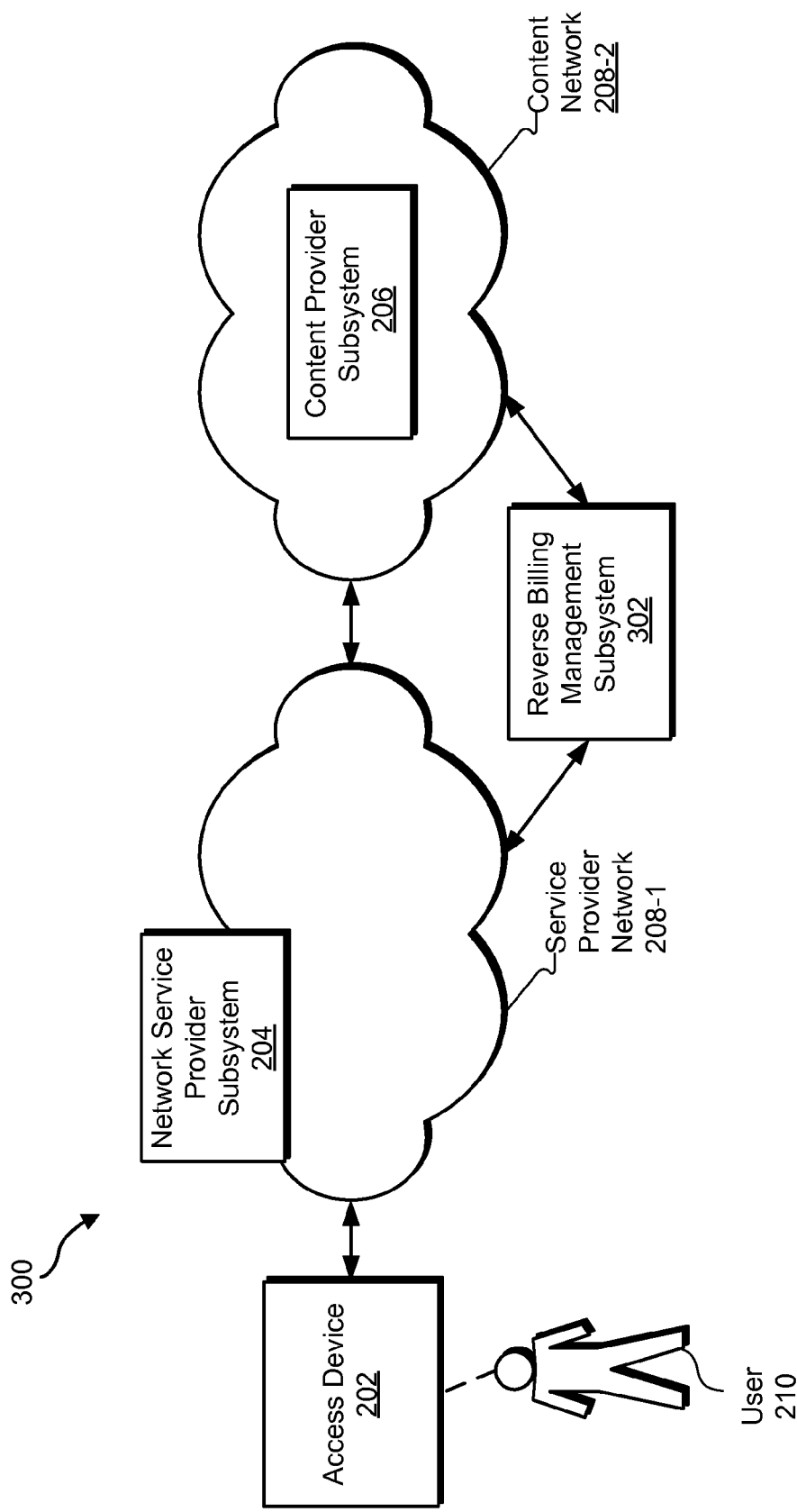
FIG. 3 illustrates another exemplary implementation of the system of FIG. 1 according to principles described herein.

FIG. 3 illustrates another exemplary implementation 300 of system 100. Implementation 300 is similar to implementation 200 shown in FIG. 2, except that implementation 300 also includes a reverse billing management subsystem 302. As shown, reverse billing management subsystem 302 may be communicatively coupled to both service provider network 208-1 and to content network 208-2. However, it will be recognized that reverse billing management subsystem 302 may alternatively be communicatively coupled only to (i.e., a part of) either service provider network 208-1 or content network 208-2.

As will be described in more detail below, reverse billing management subsystem 302 may be configured to perform any operation associated with providing subsidized access by a user to network content. Hence, reverse billing management subsystem 302 may be implemented by any suitable combination of one or more computing devices. For example, reverse billing management subsystem 302 may be implemented by one or more servers (e.g., proxy servers).

In some examples, reverse billing management subsystem 302 may be integrated into network service provider subsystem 204 or otherwise managed by a network service provider. Alternatively, reverse billing management subsystem 302 may be integrated into content provider subsystem 206 or otherwise managed by a content provider. In some alternative examples, reverse billing management subsystem 302 may be managed by a third party entity separate from the network service provider and the content provider. In these examples, the same reverse billing management subsystem 302 may be used to provide subsidized access to network content by way of various different service provider networks (e.g., by way of various different wireless carrier networks).

Figure 4:
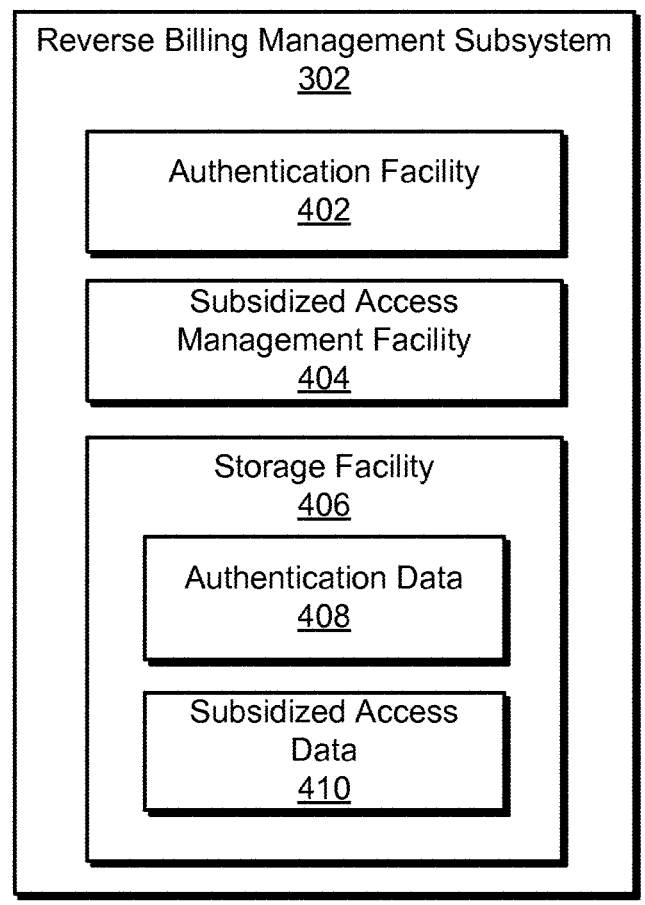
FIG. 4 illustrates exemplary components of a reverse billing management subsystem according to principles described herein.

FIG. 4 illustrates exemplary components of reverse billing management subsystem 302. As shown, reverse billing management subsystem 302 may include, without limitation, an authentication facility 402, a subsidized access management facility 404, and a storage facility 406 selectively and communicatively coupled to one another. It will be recognized that although facilities 402-406 are shown to be separate facilities in FIG. 4, any of facilities 402-406 may be combined into fewer facilities, such as into a single facility, or divided into more facilities as may serve a particular implementation.

Authentication facility 402 may be configured to authenticate a particular content provider subsystem offering subsidized access to network content. This may be performed in any suitable manner. For example, as will be described below, authentication facility 402 may authenticate a content provider subsystem using a challenge/answer handshake heuristic. Authentication facility 402 may be further configured to authenticate a user and/or an access device requesting access to network content.

Subsidized access management facility 404 may perform one or more subsidized access operations. For example, subsidized access management facility 404 may facilitate subsidized access by a user to network content in accordance with a rule set and/or otherwise perform any of the subsidized access operations described above in connection with subsidized access management facility 104.

Storage facility 406 may be configured to maintain authentication data 408 generated and/or used by detection facility 402 and subsidized access data 410 generated and/or used by subsidized access management facility 404. Storage facility 406 may maintain additional or alternative data as may serve a particular implementation.

Returning to FIG. 3, in certain embodiments, system 100 may be implemented entirely by or within access device 202, network provider subsystem 204, content provider subsystem 206, and/or reverse billing management subsystem 302. For example, system 100 may be implemented entirely by access device 202 or by reverse billing management subsystem 302. In other embodiments, components of system 100 may be distributed across any combination or sub-combination of access device 202, network provider subsystem 204, content provider subsystem 206, and reverse billing management subsystem 302.

Figure 5:
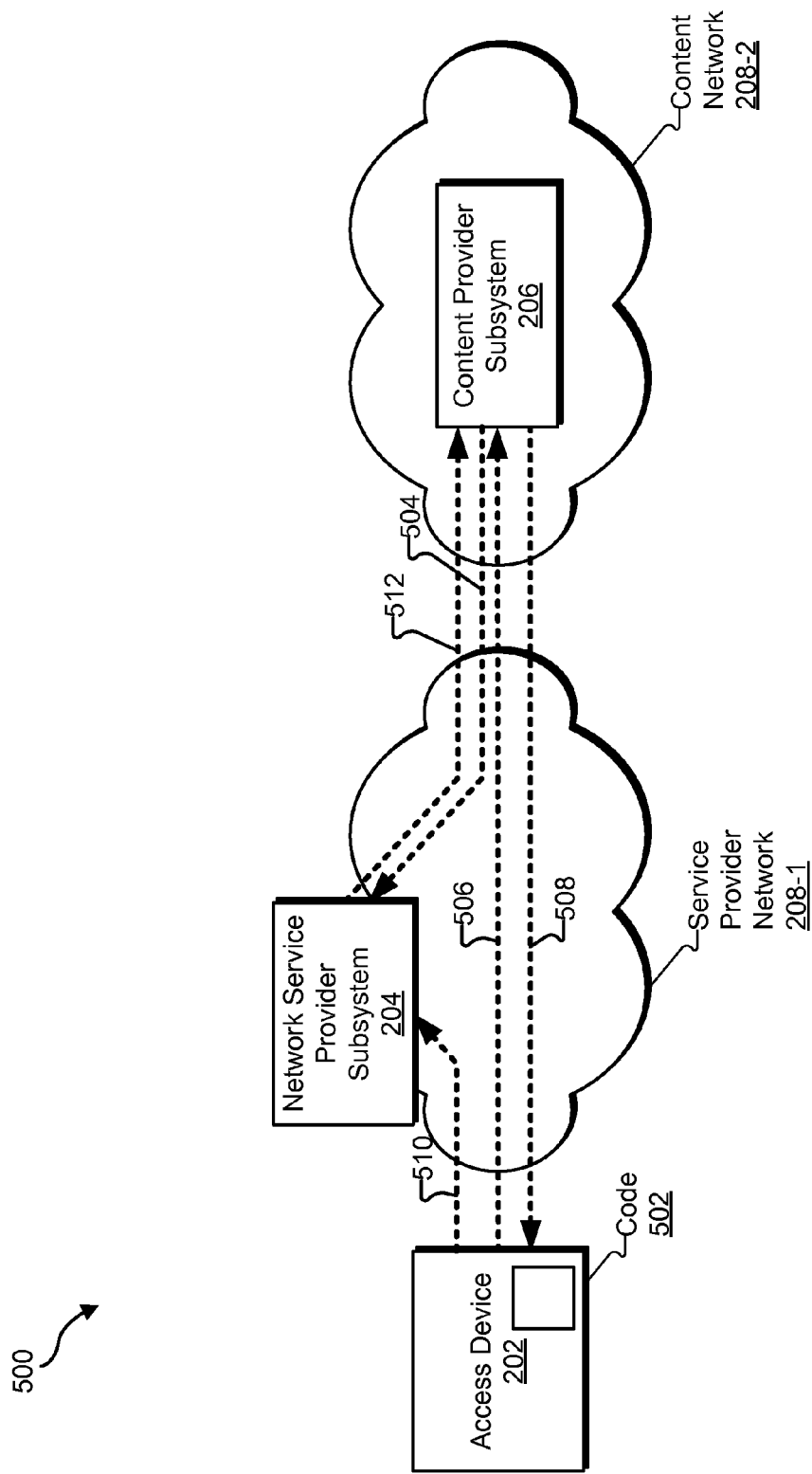
FIG. 5 shows an exemplary configuration wherein the system of FIG. 1 is at least partially implemented by an access device according to principles described herein.

FIG. 5 shows an exemplary configuration 500 wherein system 100 is at least partially implemented by access device 202. In this example, access device 202 may include code 502 residing thereon that is configured to detect a request provided by a user of access device 202 to access network content maintained by content provider subsystem 206 by way of service provider network 208-1, determine that a data usage charge for access by the user to the network content by way of service provider network 208-1 is subsidized by the content provider associated with content provider subsystem 206, and provide the user with subsidized access to the network content. Code 502 may be in the form of an application or module (e.g., a downloadable application) executed by access device 202, built into the operating system of access device 202, and/or otherwise provided for execution by access device 202. In some implementations, code 502 may include explicit routing code and/or may be configured as an access point name ("APN") that allows special routing for certain application traffic.

An example of providing subsidized access to network content utilizing code 502 will now be provided. A user of access device 202 may download an e-book application (e.g., an "e-book app" such as an Amazon Kindle app) onto access device 202, which, for purposes of this example, is a tablet computer (e.g., an iPad). The user may desire to download e-books for the e-book application from content provider subsystem 206, but may be hesitant because he or she will be responsible for the purchase price of the e-books themselves and for the data usage charge associated with downloading the data representative of the e-books.

Hence, to incentivize the user to purchase e-books for use with the e-book application, a provider of the e-books (i.e., the content provider associated with content provider subsystem 206) may subsidize the data usage charge associated with downloading the e-books. For example, the e-book provider may entirely subsidize the data usage charge so that the data used to download the e-books does not count against the user's predetermined data usage limit and/or so that the user does not have to pay anything for using data to download the e-books.

To this end, as represented by data flow 504, the e-book provider may register (e.g., by way of a portal provided by network service provider subsystem 204) content provider subsystem 206 with network service provider subsystem 204 (e.g., with one or more billing management servers included within network service provider subsystem 204). In other words, the e-book provider may enter into a subsidized access arrangement with network service provider subsystem 204 that specifies that the e-book provider will subsidize user access to e-book content maintained by content provider subsystem 206. During the registration process, the e-book provider may additionally specify a rule set that defines a manner in which user access to the e-book content maintained by content provider subsystem 206 is to be subsidized by the e-book provider. For example, the rule set may specify that only certain e-books will be subsidized, that only certain users (e.g., only first time e-book purchasers) will receive subsidized access to the e-book content, and/or that the e-book provider will only subsidize a certain amount of data usage charges per user. Other rules may be specified as may serve a particular implementation.

Once the content provider subsystem 206 is registered with network service provider subsystem 204, data representative of the rule set associated with the content provider subsystem 206 may be provided to access device 202 in the form of code 502. For example, code 502 may be included in the e-book application that is downloaded by access device 202 or downloaded by access device 202 as a software update subsequent to the e-book application being downloaded by access device 202. In some examples, content provider subsystem 206 receives the data to be included in code 502 from network service provider subsystem 204 during the registration process.

Access device 202 may then transmit a request to purchase and download an e-book to content provider subsystem 206, as shown by data flow 506. Code 502 may detect the request and determine, based on the URL of content provider subsystem 206 and/or on the rule set specified by content provider subsystem 206, that the data usage charge associated with downloading the e-book is to be subsidized by content provider subsystem 206. In response, code 502 may track an amount of data transmitted between content provider subsystem 206 and access device 202 while e-book is being downloaded by access device 202 (represented by data flow 508). The data may be tracked in any suitable manner. For example, code 502 may count the number of bytes of data transmitted between content provider subsystem 206 and access device 202 while e-book is being downloaded.

Code 502 may be further configured to direct the network service provider to adjust the data usage charge associated with downloading the e-book in accordance with the tracked amount of data and the rule set associated with the subsidized access arrangement between content provider subsystem 206 and network service provider subsystem 204. For example, as represented by data flow 510, code 502 may direct access device 202 to transmit data representative of the tracked amount of data (and, in some examples, data representative of the rule set) to network service provider subsystem 204, which may then adjust the data usage charge accordingly.

Network service provider subsystem 204 may adjust the data usage charge associated with the user accessing the network content in any suitable manner. For example, network service provider subsystem 204 may adjust the data usage charge by determining, modifying, reducing, and/or reimbursing the data usage charge based on the tracked amount of data and the rule set associated with the subsidized access arrangement between the content provider and the network service provider. In some examples, as represented by data flow 512, network service provider subsystem 204 may transmit a request to content provider subsystem 206 for content provider subsystem 206 to reimburse network service provider subsystem 204 for the subsidized data usage charge.

Figure 6:
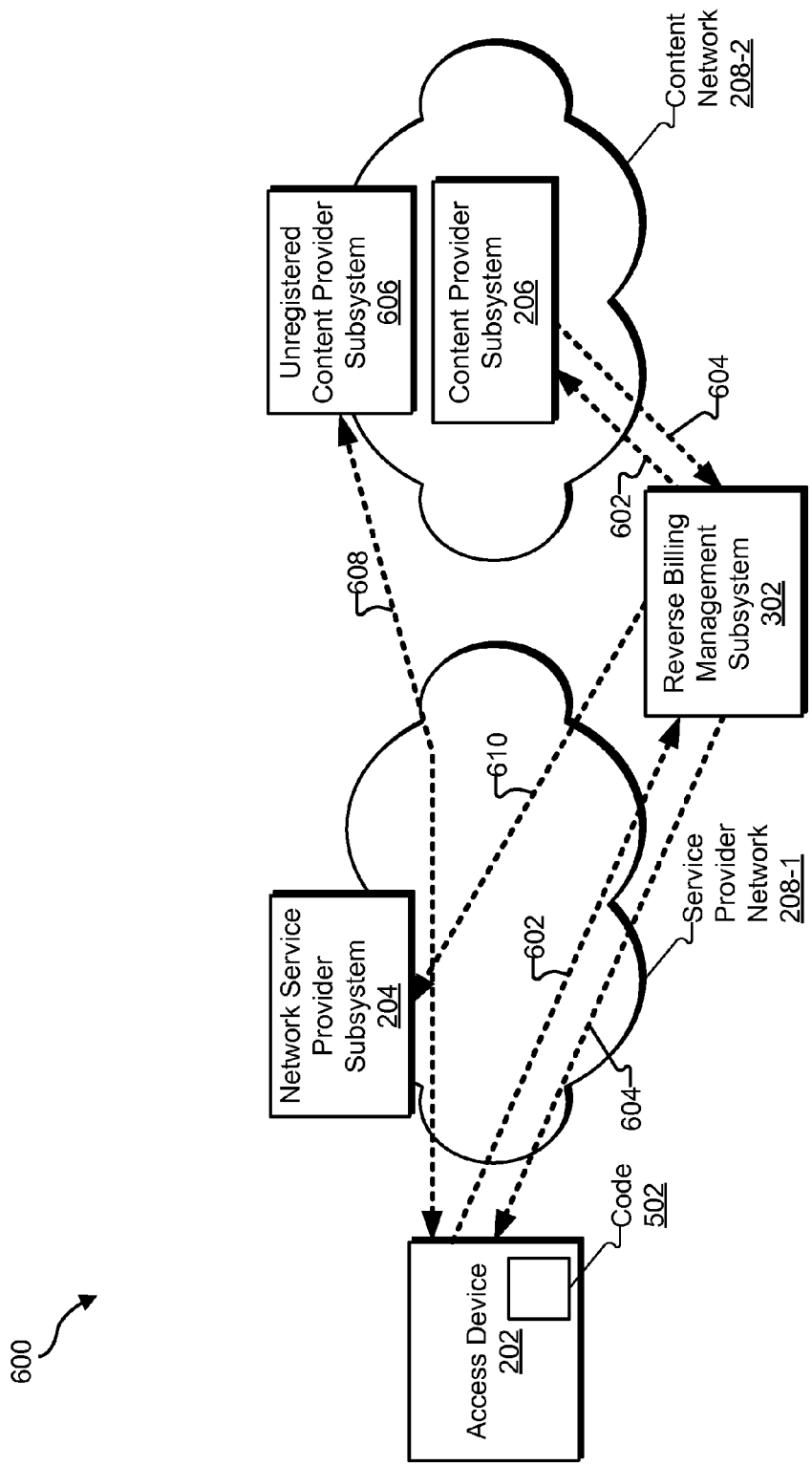
FIG. 6 shows another exemplary configuration wherein the system of FIG. 1 is at least partially implemented by an access device according to principles described herein.

FIG. 6 illustrates an alternative configuration 600 in which code 502 provides the user with subsidized access to network content by routing data transmitted between access device 202 and content provider subsystem 206 through reverse billing management subsystem 302 while the user accesses the network content. Referring again to the e-book example, code 502 may determine that access to the e-book content is subsidized by content provider subsystem 206. In response, code 502 may route the request to purchase and download the e-book intended for content provider subsystem 206 through reverse billing management subsystem 302 (as illustrated in FIG. 6 by data flow 602). Network traffic that flows between content provider subsystem 206 and access device 202 while the e-book is being downloaded by access device 202 (as illustrated in FIG. 6 by data flow 604) is also routed through reverse billing management subsystem 302. In contrast, network traffic that flows between an unregistered content provider subsystem 606 (i.e., a content provider subsystem associated with a content provider that does not subsidize access to network content) is not routed through reverse billing management subsystem 302, as illustrated in FIG. 6 by data flow 608.

In some examples, an amount of data that flows between content provider subsystem 206 and access device 202 is tracked by reverse billing management subsystem 302 (e.g., at the direction of code 502). Reverse billing management subsystem 302 may then direct network service provider subsystem 204 to adjust the data usage charge associated with downloading the e-book in accordance with the tracked amount of data and the rule set associated with the subsidized access arrangement between content provider subsystem 206 and network service provider subsystem 204. For example, as represented by data flow 610, reverse billing management subsystem 302 may transmit data representative of the tracked amount of data (and, in some examples, data representative of or identifying the rule set) to network service provider subsystem 204, which may then adjust the data usage charge as described above.

Figure 7:
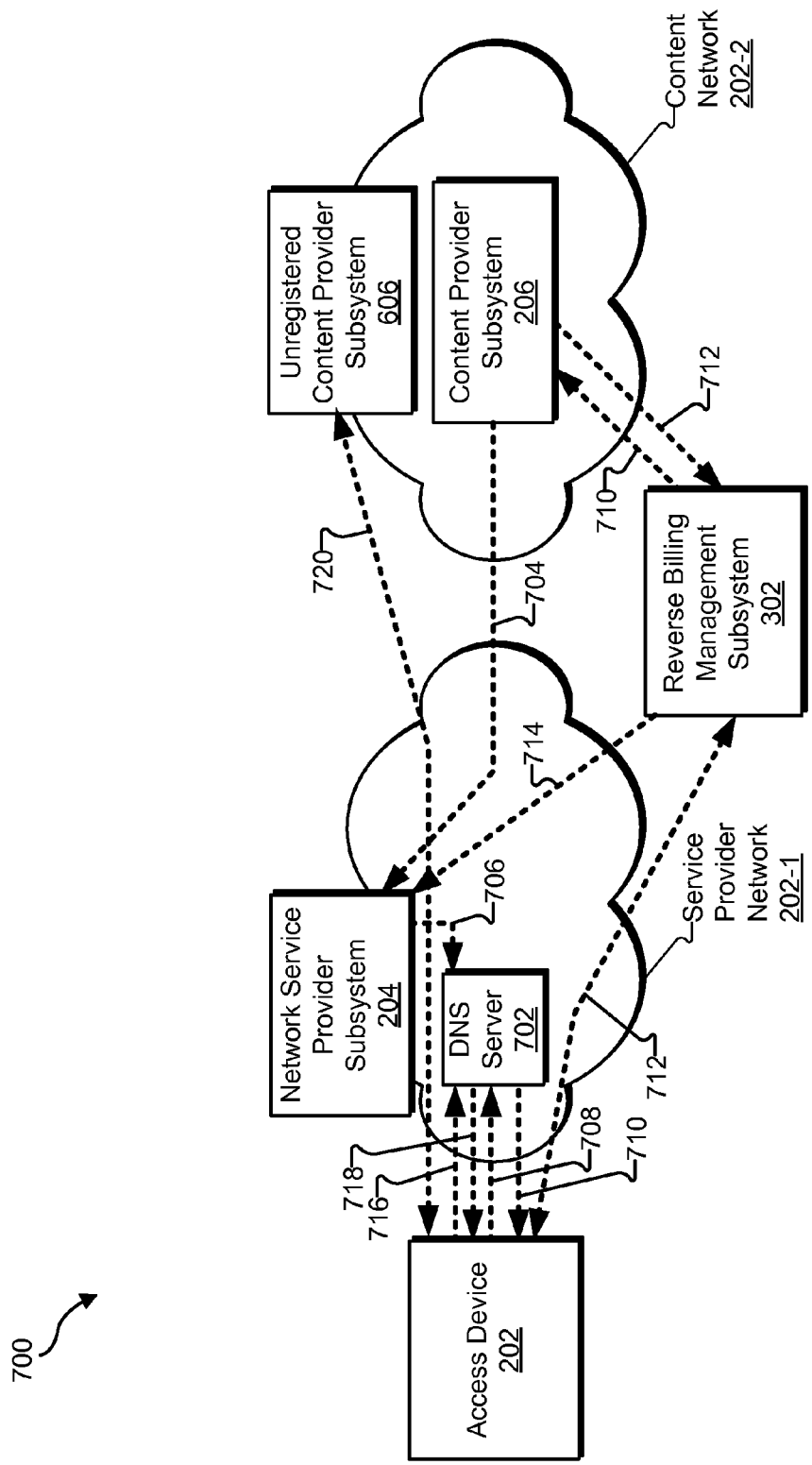
FIG. 7 shows an exemplary configuration wherein the system of FIG. 1 is at least partially implemented by a domain name services ("DNS") server associated with a network service provider subsystem according to principles described herein.

FIG. 7 shows an alternative configuration 700 wherein system 100 is at least partially implemented by a DNS server 702 associated with (e.g., included within) network service provider subsystem 204. In this example, access device 202 may provide (e.g., transmit) a route lookup request (i.e., a request for a particular route that a request for network content from content provider subsystem 206 is to take) to DNS server 702. DNS server 702 may analyze the route lookup request and determine, based on a URL of the requested network content, whether to route the request and subsequent network traffic associated with accessing the network content through reverse billing management subsystem 302 (which, in this case, may be operating as an explicit or transparent proxy server). Reverse billing management subsystem 302 may then track an amount of data that flows through reverse billing management subsystem 302 during a particular network content access session and direct network service provider subsystem 204 to adjust a data usage charge associated with accessing the network content accordingly.

To illustrate, reference is again made to the e-book example provided above in connection with FIGS. 5-6. To register content provider subsystem 206 with network service provider subsystem 204, the e-book provider may transmit data representative of the URL of content provider subsystem 206 to network service provider subsystem 204 (as represented by data flow 704). The registration request may additionally specify a rule set that defines a manner in which user access to the e-book content maintained by content provider subsystem 206 is to be subsidized by the e-book provider, as described above. In response to the registration request, as represented by data flow 706, network service provider subsystem 204 may update DNS server 702 with data representative of an instruction to route network traffic intended for the URL of content provider subsystem 206 by way of reverse billing management subsystem 302. In some examples, registering a content provider subsystem with a network service provider subsystem also registers the content provider subsystem with reverse billing management subsystem 302.

The user may then provide a request to purchase and download an e-book from content provider subsystem 206. In response, access device 202 may first provide a route look-up request (which includes the URL of content provider subsystem 206) to DNS server 702, as shown by data flow 708. DNS server 702 may, based on the URL included in the route look-up request, provide a response back to access device 202, as shown by data flow 710. The response includes directions to route network traffic between access device 202 and content provider subsystem 206 through reverse billing management subsystem 302. The request to purchase and download the e-book, as well as subsequent network traffic between access device 202 and content provider subsystem 206 associated with the download of the e-book by access device 202, is accordingly routed through reverse billing management subsystem 302, as represented by data flow 712.

As described above in connection with FIG. 6, the amount of data that flows between content provider subsystem 206 and access device 202 is tracked by reverse billing management subsystem 302. Reverse billing management subsystem 302 may direct network service provider subsystem 204 to adjust the data usage charge associated with downloading the e-book in accordance with the tracked amount of data and the rule set associated with the subsidized access arrangement between content provider subsystem 206 and network service provider subsystem 204. For example, as represented by data flow 714, reverse billing management subsystem 302 may transmit data representative of the tracked amount of data (and, in some examples, data representative of or identifying the rule set) to network service provider subsystem 204, which may then adjust the data usage charge as described above.

FIG. 7 also illustrates an exemplary data flow that occurs when the user accesses network content maintained by unregistered content provider subsystem 606. As shown by data flow 716, access device 202 may first provide a route look-up request (which includes the URL of unregistered content provider subsystem 606) to DNS server 702. DNS server 702 may, based on the URL included in the route look-up request, provide a response back to access device 202, as shown by data flow 718. The response includes directions to route data from access device 202 directly to unregistered content provider subsystem 606 (i.e., independent of reverse billing management subsystem 302). Subsequent network traffic between access device 202 and unregistered content provider subsystem 606 (represented by data flow 720) is therefore not routed through billing management subsystem 302.

To illustrate, the user may direct access device 202 to provide a request to access a webpage maintained by unregistered content provider subsystem 606. Data representative of the webpage (i.e., source code) may be returned by unregistered content provider subsystem 606 directly to access device 202 (i.e., independent of reverse billing management subsystem 302) so that access device 202 may render (i.e., display) the webpage in a web browser.

In some examples, the source code for the webpage described in the previous example may include a URL of an object that is to be embedded within (i.e., displayed within) the webpage. The object may be linked to an advertisement, movie trailer, or other type of network content provided by content provider subsystem 206 that the user may access by selecting the object. Before rendering the object within the webpage, access device 202 may resolve the URL of the object with the DNS server 702. During this process, DNS server 702 recognizes, based on the URL of the object, that the content provider associated with content provider subsystem 206 will subsidize access to the network content associated with the object. In response, DNS server 702 routes a request for the object to content provider subsystem 206, which returns source code representative of both the object and a notification that access to the network content associated with the object will be subsidized by the content provider. Access device 202 may then render the object and the notification (e.g., a text banner superimposed on the object) within the webpage. In this manner, the user may be notified that if he or she selects (e.g., clicks on) the object to access network content associated with the object, a data usage charge incurred will be subsidized by the content provider.

FIG. 8 shows an alternative configuration 800 wherein system 100 is at least partially implemented by reverse billing management subsystem 302. In this example, all network traffic 802 flowing through service provider network 208-1 is routed through reverse billing management subsystem 302. Reverse billing management subsystem 302 may be configured to dynamically (and, in some examples, at or near real-time speed) analyze the network traffic 802 and identify (i.e., flag, peel out, or otherwise treat differently) a set of network traffic 804 associated with network content to which subsidized access is provided by a content provider. Reverse billing management subsystem 302 may then provide subsidized access to the network content associated with the identified network traffic 804. The remaining network traffic 806 is tracked and billed for as it normally would be by network service provider subsystem 204.

Reverse billing management subsystem 302 may identify network traffic 804 as being associated with network content to which subsidized access is provided by a content provider in any suitable manner. For example, reverse billing management subsystem 302 may analyze information included in packet headers included in the network traffic, match patterns in one or more payloads included in the network traffic, identify URLs specified in the network traffic, or otherwise acquire information that may be indicative as to whether the network traffic is associated with network content to which subsidized access is provided by a content provider.

Likewise, reverse billing management subsystem 302 may provide subsidized access to network content associated with identified network traffic 804 in any suitable manner. For example, as represented by data flow 808, reverse billing management subsystem 302 may receive a request provided by access device 202 to access network content maintained by content provider subsystem 206 by way of service provider network 208-1. In response to receiving the request, reverse billing management subsystem 302 may determine that content provider subsystem 206 is registered with reverse billing management subsystem 302 (i.e., that access to the network content is subsidized by the content provider).

Once the reverse billing management subsystem 302 determines that content provider subsystem 206 is registered with reverse billing management subsystem 302, reverse billing management subsystem 302 may insert data representative of a challenge in to the request. As will be described below, an answer provided by content provider subsystem 206 to the challenge may be analyzed to authenticate content provider subsystem 206.

Reverse billing management subsystem 302 may then deliver the request including the challenge to content provider subsystem 206, as represented by data flow 810. Content provider subsystem 206 may transmit a response message back to reverse billing management subsystem 302, as represented by data flow 812. The response message may include data representative of an answer to the challenge and data representative of or identifying a rule set specifying a manner in which the content provider subsidizes a data usage charge associated with access by the user to the network content.

Reverse billing management subsystem 302 may then authenticate content provider subsystem 206 based on the answer included in the response message. For example, reverse billing management subsystem 302 may determine that the answer to the challenge is correct. It will be recognized that the challenge and answer may be generated and/or provided in accordance with any suitable challenge/answer handshake heuristic.

Once content provider subsystem 206 has been authenticated, reverse billing management subsystem 302 may facilitate subsidized access by the user to the network content in accordance with the rule set specified in the response message. In some examples, this may be performed by routing all data transmitted between access device 202 and content provider subsystem 206 through reverse billing management subsystem 302 while the user accesses the network content (as represented in FIG. 8 by data flow 814), tracking an amount of the data transmitted between access device 202 and content provider subsystem 206 while the user accesses the network content, and directing network service provider 204 to adjust the data usage charge in accordance with the tracked amount of data and the rule set (as represented in FIG. 8 by data flow 816).

In some examples, the response message transmitted by content provider subsystem 206 to reverse billing management subsystem 302 may include data representative of a notification that access by the user to the network content is subsidized by the content provider. In these examples, reverse billing management subsystem 302 may facilitate subsidized access by the user to the network content by directing access device 202 to present the notification. This may be performed in any suitable manner.

For example, as will be described in more detail below, the data representative of the notification may be included in the response message in the form of an inactive code snippet. Reverse billing management subsystem 302 may be configured to direct access device 202 to present the notification by activating the inactive code snippet representative of the notification and transmitting the response message having the activated code snippet representative of the notification to access device 202. Access device 202 may then present (e.g., display) the notification in accordance with the activated code snippet.

An example illustrating the features described in connection with FIG. 8 will now be provided. For ease of illustration, reference is again made to the e-book example provided above in connection with FIGS. 5-7. It will be assumed for purposes of this example that content provider subsystem 206 has registered with reverse billing management subsystem 302.

As mentioned, a user may desire to purchase and download an e-book for use with an e-book application residing on access device 202. To this end, the user may direct access device 202 to transmit a request to content provider subsystem 206 for the e-book. Reverse billing management subsystem 302 may then insert data representative of a challenge into the request and the deliver the request to content provider subsystem 206. Content provider subsystem 206 may then transmit a response message to reverse billing management subsystem 302 that includes data representative of an answer to the challenge, data representative of or identifying a rule set, and data representative of the e-book.

Reverse billing management subsystem 302 may authenticate the content provider subsystem 206 (e.g., by analyzing the answer contained in the response message) and identify the rule set. Reverse billing management subsystem 302 may then provide subsidized access by the user to the e-book in accordance with the identified rule set. For example, reverse billing management subsystem 302 may track an amount of data transmitted between content provider subsystem 206 and access device 202 while e-book is being downloaded by access device 202 and direct the network service provider to adjust the data usage charge associated with downloading the e-book in accordance with the tracked amount of data and the rule set.

In some examples, reverse billing management subsystem 302 may authenticate content provider subsystem 206 before the user directs access device 202 to access network content maintained by content provider subsystem 206. For example, with reference again to the e-book example, the user may direct access device 202 to initiate (i.e., begin executing) the e-book application residing on access device 202. In response, access device 202 may transmit a request for network content (e.g., personalized recommendations, user-specific data, etc.) for use by the e-book application. Reverse billing management subsystem 302 may then insert data representative of a challenge into the request and the deliver the request to content provider subsystem 206. Content provider subsystem 206 may then transmit a response message to reverse billing management subsystem 302 that includes data representative of an answer to the challenge, data representative of or identifying a rule set, and data representative of a notification that is to be presented by access device 202 to the user.

Reverse billing management subsystem 302 may authenticate the content provider subsystem 206 (e.g., by analyzing the answer contained in the response message) and identify the rule set. Data representative of the notification may then be transmitted to access device 202. Access device 202 may then present the notification. For example, access device 202 may present a notification within the e-book application that reads: "Data usage charges will not be incurred for any e-book purchased today!".

Subsequent requests provided by the user to purchase and download e-books will be treated in a similar manner by reverse billing management subsystem 302, which may track an amount of data used to download the e-books and notify network service provider subsystem 204 so that network service provider subsystem 204 may adjust the data usage charge(s) accordingly.

As mentioned, data representative of an answer to a challenge, a rule set, and/or a notification may be included in a message provided to reverse billing management subsystem 302 by content provider subsystem 206. For example, such data may be represented by one or more code snippets included in source code (e.g., HTML or XML) associated with the network content (e.g., representative of the network content itself, representative of a selectable object configured to provide access to the network content, etc.), in one or more packet headers included in network traffic associated with the network content, and/or in one or more payload portions of network traffic associated with the network content.

To illustrate, FIG. 9 shows an exemplary portion of source code 900 for a webpage that includes a code snippet 902 representative of a selectable object configured to provide access to the network content. As shown, code snippet 902 also includes data representative of a notification that access to the network content will be subsidized (i.e., "Browsing this site will not incur data charges"). Source code 900 also includes a code snippet 904 representative of an answer to a challenge (i.e., "ID=2DFF769032A6C1E4") and a rule set (i.e., "ACCT=1906743921, CID=345, Type=Full Site").

As shown in FIG. 9, code snippets 902 and 904 may be inactive. In the particular example of FIG. 9, code snippets 902 and 904 are inactive because they are commented out. However, it will be recognized that code snippets 902 and 904 may be alternatively inactivated in any other way as may serve a particular implementation. As mentioned, inactive code snippets may be ignored by network elements and computing devices (e.g., access devices associated with users not authorized to receive subsidized access to the network content associated with the selectable object) not specifically configured to recognize and process inactive code snippets. However, reverse billing management subsystem 302 is configured to recognize and process inactive code snippets. Hence, reverse billing management subsystem 302 may authenticate content provider subsystem 206 based on the challenge answer included in inactive code snippet 902 and identify a rule set based on the rule set information included in inactive code snippet 904.

Upon successful authentication of content provider subsystem 206, reverse billing management subsystem 302 may activate code snippet 902 (i.e., the data representative of the selectable object and the notification) by, for example, uncommenting code snippet 902. For example, FIG. 10 shows source code 900 after code snippet 902 has been activated. With code snippet 902 activated, reverse billing management subsystem 302 may transmit source code 900 to access device 202, which may recognize activated code snippet 902 and present the selectable object and the notification within a display of the website accordingly.

It will be recognized that although the exemplary notifications described herein have all included text, it will be recognized that the notifications may additionally or alternatively include any graphical content (e.g., one or more images), audio content (e.g., one or more audible sounds), and/or any other type of content that may be used to notify a user (e.g., during a current context of the user's network content access session) that access to network content is subsidized. For example, a notification may include an audio prompt within a streaming audio session. Additionally or alternatively, the notification may include a video insert or text overlay into a video stream in the context of a streaming video session.

In some examples, system 100 (e.g., subsidized access management facility 104) may be additionally or alternatively configured to provide the user with subsidized access in accordance with a user profile associated with the user. As used herein, a "user profile" associated with a user may include data representative of one or more of the user's traits (e.g., one or more demographic attributes of the user), preferences (e.g., genre preferences, product preferences, etc.), tendencies (e.g., viewing habits), privileges (e.g., online memberships, classifications, etc.), origination credentials (e.g., originating IP or hardware address, authentication certificate, encryption key, etc.) and/or any other type of information associated with the user. The user profile information may be maintained within storage facility 106 or otherwise accessed by subsidized access management facility 104.

To facilitate subsidized access to network content based on a profile of a user, subsidized access management facility 104 may be configured to identify and/or authenticate the user. This may be performed in any suitable manner. For example, the user may be required to provide identifying credentials (e.g., by logging in with a user name and password, secure ID token, smart card authentication, fingerprint/retina scan authorization, etc.) to a particular website, a particular application, a portal, or other interface provided by or accessible to subsidized access management facility 104. Once the identity of the user is identified and/or authenticated, subsidized access management facility 104 may provide subsidized access by the user to network content in accordance with a rule set comprising one or more user profile-based conditions that have to be met in order for subsidized access to be provided to the user.

To illustrate, a provider of a website may desire to provide users who have purchased an annual membership to the website with subsidized access to the website. To this end, the provider of the website may include a rule in the rule set associated with the subsidized access arrangement between the website provider and the network service provider that specifies that subsidized access is to be granted only to those users who have purchased the annual membership. Subsidized access management facility 104 may then identify whether a particular user has purchased an annual membership based on data included in the user's user profile and determine whether to provide subsidized access to the website accordingly.

In some examples, a content provider may incentivize a user to access network content by providing the user with subsidized access to additional (i.e., different) network content if the user accesses the network content. For example, a provider of a movie trailer may incentivize users to view the movie trailer by offering a certain number of "free" access minutes (e.g., 15 minutes) during which the users may browse or otherwise access network content of the users' choosing if the users view the movie trailer. To this end, the content provider may specify within a rule included in the rule set that if a user views the movie trailer, subsidized access management facility 104 is to provide subsidized access to additional network content of the user's choosing for a predetermined time period. Subsidized access management facility 104 may then detect that the user has viewed the movie trailer and, in response, provide the user with subsidized access to the additional network content for the predetermined time period.

Figure 11:
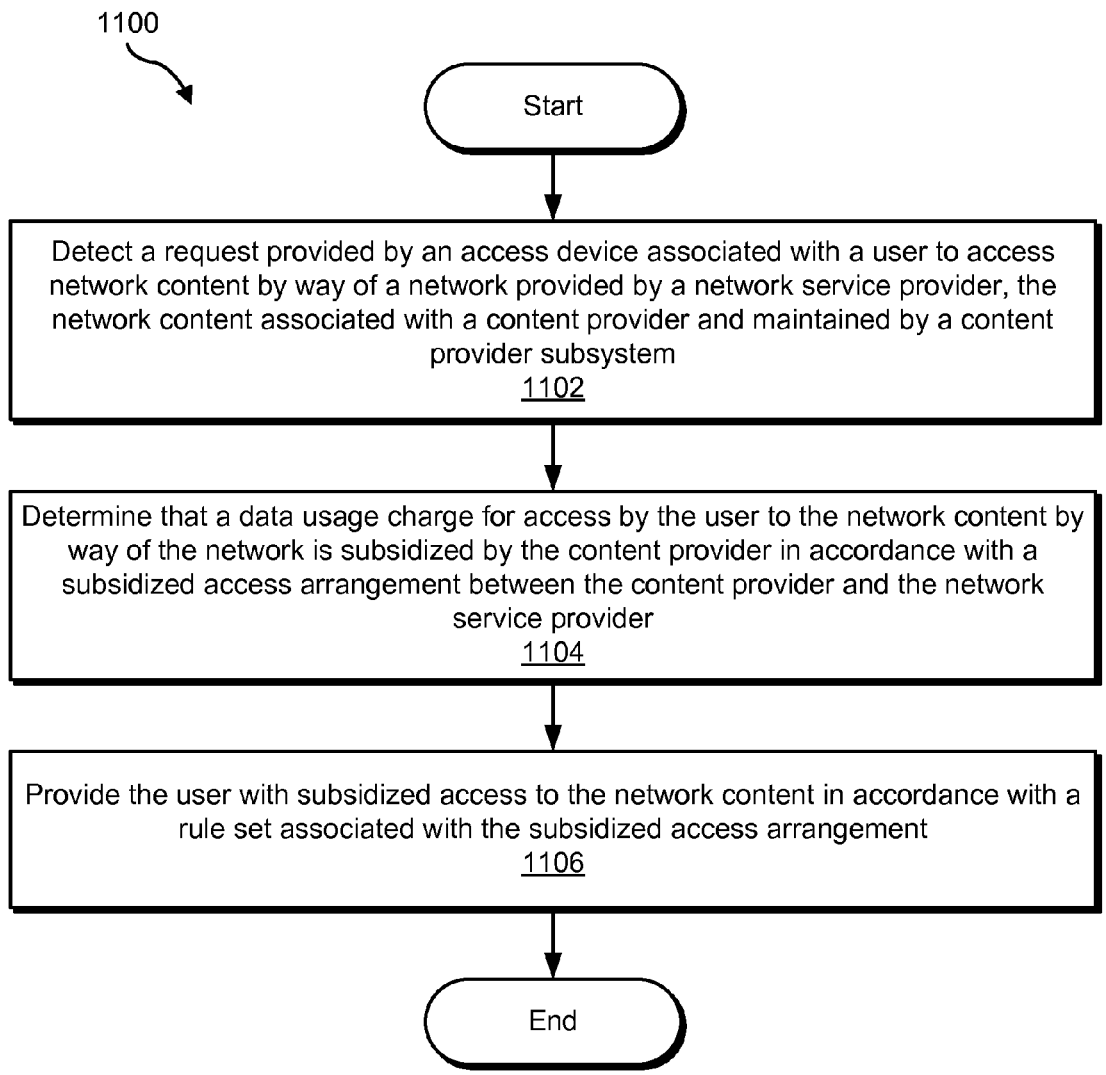
FIG. 11 illustrates an exemplary method of providing subsidized access to network content according to principles described herein.

FIG. 11 illustrates an exemplary method 1100 of providing subsidized access to network content. While FIG. 11 illustrates exemplary steps according to one embodiment, other embodiments may omit, add to, reorder, and/or modify any of the steps shown in FIG. 11. One or more of the steps shown in FIG. 11 may be performed by system 100 and/or any implementation thereof.

In step 1102, a content delivery system detects a request provided by an access device associated with a user to access network content by way of a network provided by a network service provider. As described above, the network content is associated with a content provider and maintained by a content provider subsystem. Step 1102 may be performed in any of the ways described herein.

In step 1104, the content delivery system determines that a data usage charge for access by the user to the network content by way of the network is subsidized by the content provider in accordance with a subsidized access arrangement between the content provider and the network service provider. Step 1104 may be performed in any of the ways described herein.

In step 1106, the content delivery system provides the user with subsidized access to the network content in accordance with a rule set associated with the subsidized access arrangement. Step 1106 may be performed in any of the ways described herein.

Figure 12:
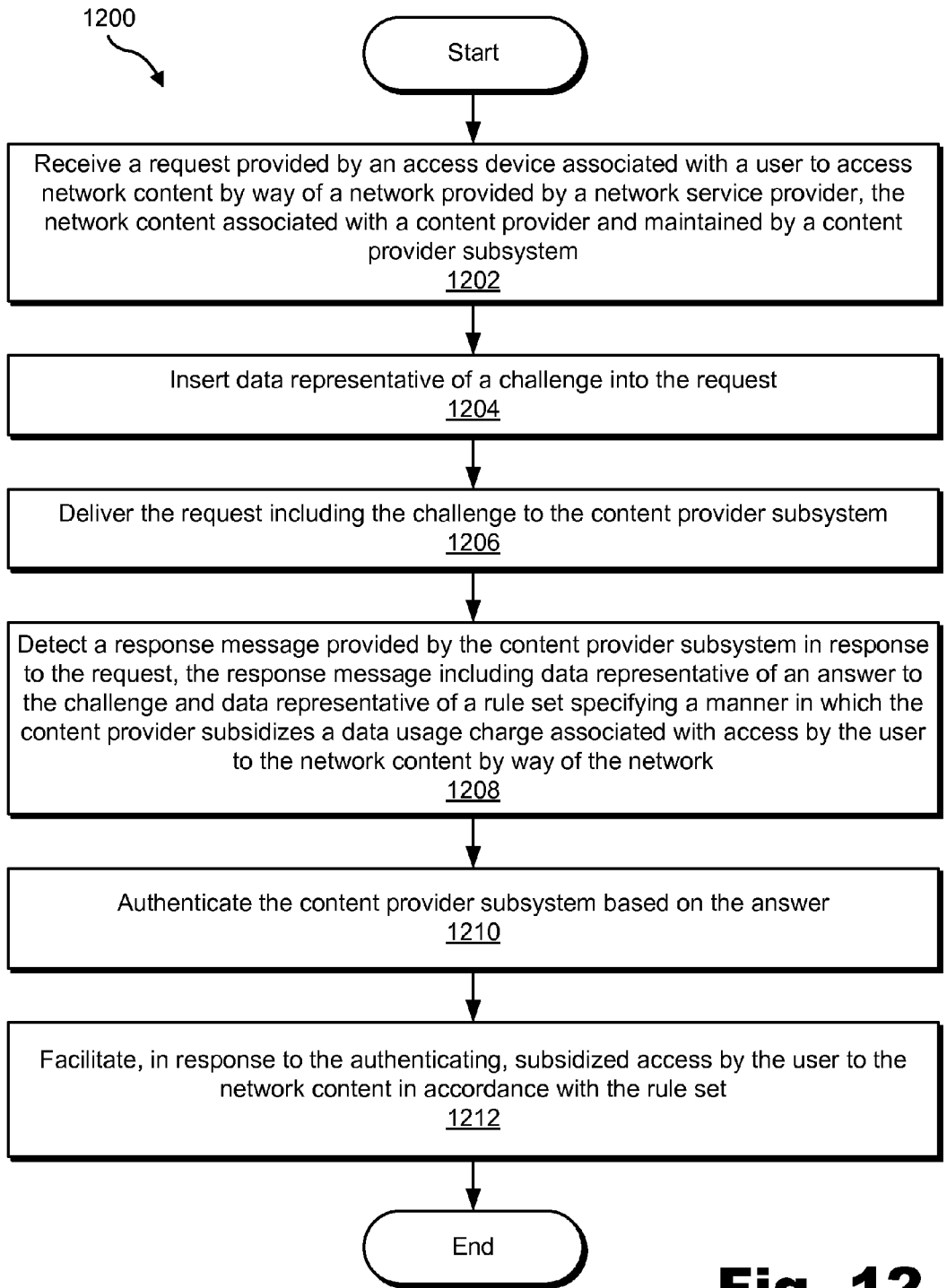
FIG. 12 illustrates another exemplary method of providing subsidized access to network content according to principles described herein.

FIG. 12 illustrates another exemplary method 1200 of providing subsidized access to network content. While FIG. 12 illustrates exemplary steps according to one embodiment, other embodiments may omit, add to, reorder, and/or modify any of the steps shown in FIG. 12. One or more of the steps shown in FIG. 12 may be performed by reverse billing management subsystem 302 and/or any implementation thereof.

In step 1202, a reverse billing management subsystem receives a request provided by an access device associated with a user to access network content by way of a network provided by a network service provider. As described above, the network content is associated with a content provider and maintained by a content provider subsystem. Step 1202 may be performed in any of the ways described herein.

In step 1204, the reverse billing management subsystem inserts data representative of a challenge into the request. Step 1204 may be performed in any of the ways described herein.

In step 1206, the reverse billing management subsystem delivers the request including the challenge to the content provider subsystem. Step 1206 may be performed in any of the ways described herein.

In step 1208, the reverse billing management subsystem detects a response message provided by the content provider subsystem in response to the request. As described above, the response message includes data representative of an answer to the challenge and data representative of a rule set specifying a manner in which the content provider subsidizes a data usage charge associated with access by the user to the network content by way of the network. Step 1208 may be performed in any of the ways described herein.

In step 1210, the reverse billing management subsystem authenticates the content provider subsystem based on the answer. Step 1210 may be performed in any of the ways described herein.

In step 1212, the reverse billing management subsystem facilitates, in response to the authenticating, subsidized access by the user to the network content in accordance with the rule set. Step 1212 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 13:
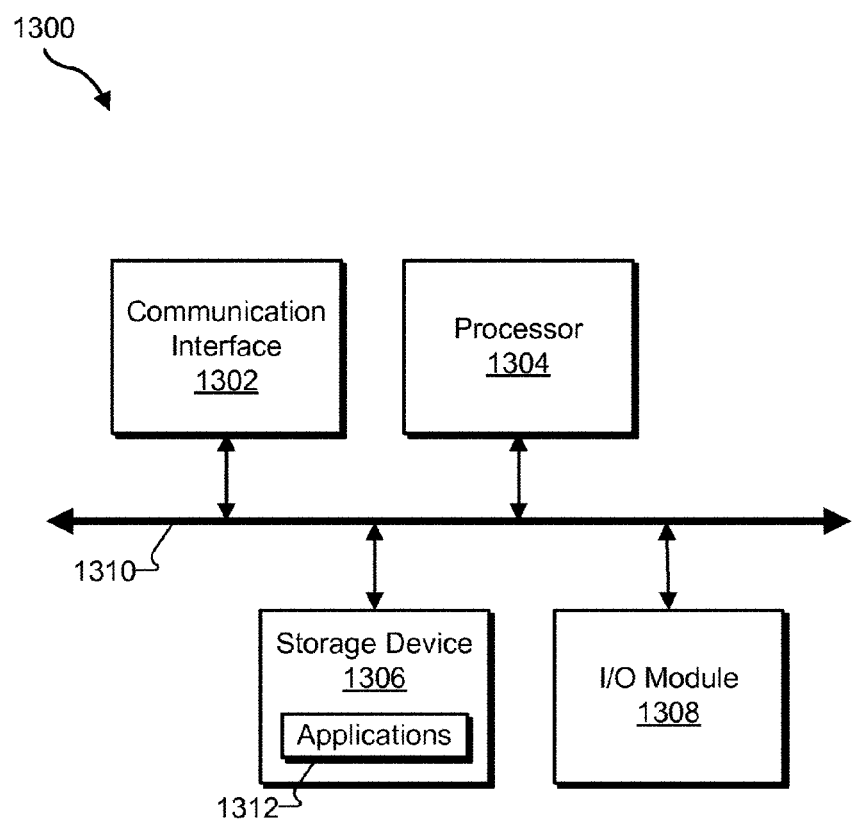
FIG. 13 illustrates an exemplary computing device according to principles described herein.

FIG. 13 illustrates an exemplary computing device 1300 that may be configured to perform one or more of the processes described herein. As shown in FIG. 13, computing device 1300 may include a communication interface 1302, a processor 1304, a storage device 1306, and an input/output ("I/O") module 1308 communicatively connected via a communication infrastructure 1310. While an exemplary computing device 1300 is shown in FIG. 13, the components illustrated in FIG. 13 are not intended to be limiting. Additional or alternative components may be used in other embodiments. Components of computing device 1300 shown in FIG. 13 will now be described in additional detail.

Communication interface 1302 may be configured to communicate with one or more computing devices. Examples of communication interface 1302 include, without limitation, a wired network interface (such as a network interface card), a wireless network interface (such as a wireless network interface card), a modem, an audio/video connection, and any other suitable interface.

Processor 1304 generally represents any type or form of processing unit capable of processing data or interpreting, executing, and/or directing execution of one or more of the instructions, processes, and/or operations described herein. Processor 1304 may direct execution of operations in accordance with one or more applications 1312 or other computer-executable instructions such as may be stored in storage device 1306 or another computer-readable medium.

Storage device 1306 may include one or more data storage media, devices, or configurations and may employ any type, form, and combination of data storage media and/or device. For example, storage device 1306 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1306. For example, data representative of one or more executable applications 1312 configured to direct processor 1304 to perform any of the operations described herein may be stored within storage device 1306. In some examples, data may be arranged in one or more databases residing within storage device 1306.

I/O module 1308 may be configured to receive user input and provide user output and may include any hardware, firmware, software, or combination thereof supportive of input and output capabilities. For example, I/O module 1308 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1308 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1308 is configured to provide graphical data to a display for presentation to a user. The graphical data may be representative of one or more graphical user interfaces and/or any other graphical content as may serve a particular implementation.

In some examples, any of the systems, subsystems, and/or facilities described herein may be implemented by or within one or more components of computing device 1300. For example, one or more applications 1312 residing within storage device 1306 may be configured to direct processor 1304 to perform one or more processes or functions associated with detection facility 102, subsidized access management facility 104, authentication facility 402, and/or subsidized access management facility 404. Likewise, storage facility 106 and/or storage facility 406 may be implemented by or within storage device 1306.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    determining, by a content delivery system, that a data usage charge for access by a user to network content by way of a network provided by a network service provider is subsidized by a content provider in accordance with a subsidized access arrangement between the content provider and the network service provider, the network content associated with the content provider and maintained by a content provider subsystem;
    directing, by the content delivery system in response to the determining that the data usage charge is subsidized by the content provider, an access device associated with the user to present a notification indicating that access by the user to the network content is subsidized by the content provider by:
        receiving source code associated with the network content and that comprises a first inactive code snippet representative of the notification and a second inactive code snippet including an authentication credential, the first and second inactive code snippets including contents commented out from the source code,
        authenticating the content provider subsystem based on the authentication credential within the second inactive code snippet,
        activating, based on the authenticating of the content provider subsystem, the first inactive code snippet representative of the notification by uncommenting the commented out contents of the first inactive code snippet, and
        transmitting the source code comprising the activated first code snippet representative of the notification to the access device, the notification identifying the network content indicated as being subsidized by the content provider;
    detecting, by the content delivery system in response to the transmitting of the source code comprising the activated first code snippet representative of the notification, a request provided by the access device associated with the user to access the network content by way of the network; and
    providing, by the content delivery system in response to the request, the user with subsidized access to the network content in accordance with a rule set associated with the subsidized access arrangement.

2. The method of claim 1, wherein the determining that the data usage charge is subsidized by the content provider comprises:
    recognizing one or more attributes of the network content; and
    determining that the data usage charge is subsidized by the content provider based on the recognized one or more attributes.

3. The method of claim 1, wherein the providing the user with the subsidized access to the network content comprises:
    tracking an amount of data transmitted between the access device and the content provider subsystem while the user accesses the network content; and
    directing the network service provider to adjust the data usage charge in accordance with the tracked amount of data and the rule set associated with the subsidized access arrangement.

4. The method of claim 1, wherein:
    the source code associated with the network content includes, within at least one of the first inactive code snippet and the second inactive code snippet, data representative of the rule set; and
    the providing the user with the subsidized access to the network content comprises
        identifying the rule set by analyzing the at least one of the first inactive code snippet and the second inactive code snippet that includes the data representative of the rule set; and
        directing the network service provider to adjust the data usage charge in accordance with the rule set.

5. The method of claim 1, wherein the providing the user with the subsidized access to the network content is further performed in accordance with a user profile associated with the user.

6. The method of claim 1, wherein the providing the user with the subsidized access to the network content comprises utilizing code residing on the access device to:
    track an amount of data transmitted between the access device and the content provider subsystem while the user accesses the network content; and
    direct the network service provider to determine the data usage charge in accordance with the tracked amount of data and the rule set associated with the subsidized access arrangement.

7. The method of claim 1, wherein the providing the user with the subsidized access to the network content in accordance with the rule set associated with the subsidized access arrangement is performed by utilizing code residing on the access device to route data transmitted between the access device and the content provider subsystem through a reverse billing management subsystem while the user accesses the network content.

8. The method of claim 7, wherein the providing the user with the subsidized access to the network content in accordance with the rule set associated with the subsidized access arrangement is further performed by utilizing the reverse billing management subsystem to:
- track an amount of the data transmitted between the access device and the content provider subsystem while the user accesses the network content; and
- direct the network service provider to adjust the data usage charge in accordance with the tracked amount of data and the rule set associated with the subsidized access arrangement.

9. The method of claim 1, wherein the providing the user with the subsidized access to the network content in accordance with the rule set associated with the subsidized access arrangement is performed by utilizing a domain name system ("DNS") server to route data transmitted between the access device and the content provider subsystem through a reverse billing management subsystem while the user accesses the network content.

10. The method of claim 9, wherein the providing the user with the subsidized access to the network content further comprises utilizing the reverse billing management subsystem to:
- track an amount of the data transmitted between the access device and the content provider subsystem while the user accesses the network content; and
- direct the network service provider to adjust the data usage charge in accordance with the tracked amount of data and the rule set associated with the subsidized access arrangement.

11. The method of claim 1, wherein the providing the user with the subsidized access to the network content comprises:
- routing the request to access the network content to the content provider subsystem through a reverse billing management subsystem;
- directing the reverse billing management subsystem to insert data representative of a challenge into the request before the request is delivered to the content provider subsystem;
- detecting that the content provider has provided a response message to the reverse billing management subsystem in response to the request, the response message including data representative of an answer to the challenge and data representative of the rule set associated with the subsidized access arrangement;
- directing the reverse billing management subsystem to authenticate the content provider subsystem based on the answer; and
- facilitating, in response to the authentication, the subsidized access by the user to the network content.

12. The method of claim 11, wherein the facilitating of the subsidized access by the user to the network content comprises:
- routing, in response to the authentication, data transmitted between the access device and the content provider subsystem through the reverse billing management subsystem while the user accesses the network content;
- directing the reverse billing management subsystem to track an amount of the data transmitted between the access device and the content provider subsystem while the user accesses the network content; and
- directing the reverse billing management subsystem to direct the network service provider to adjust the data usage charge in accordance with the tracked amount of data and the rule set associated with the subsidized access arrangement.

13. The method of claim 1, further comprising:
- detecting, by the content delivery system, that the user has accessed the network content; and
- providing, by the content delivery system in response to the detecting that the user has accessed the network content, the user with subsidized access to additional network content in accordance with the rule set associated with the subsidized access arrangement.

14. A system comprising:
- a processor;
- a memory communicatively coupled to the processor and that stores executable instructions that, when executed by the processor, cause the processor to perform operations comprising:
  - determining that a data usage charge for access by a user to network content by way of a network provided by a network service provider is subsidized by a content provider in accordance with a subsidized access arrangement between the content provider and the network service provider, the network content associated with a content provider and maintained by a content provider subsystem,
  - directing, in response to the determination that the data usage charge is subsidized by the content provider, an access device associated with the user to present a notification indicating that access by the user to the network content is subsidized by the content provider by
    - receiving source code associated with the network content and that comprises a first inactive code snippet representative of the notification and a second inactive code snippet including an authentication credential, the first and second inactive code snippets including contents commented out from the source code,
    - authenticating the content provider subsystem based on the authentication credential within the second inactive code snippet,
    - activating, based on the authenticating of the content provider subsystem, the first inactive code snippet representative of the notification by uncommenting the commented out contents of the first inactive code snippet, and
    - transmitting the source code comprising the activated first code snippet representative of the notification to the access device, the notification identifying the network content indicated as being subsidized by the content provider,
  - detecting, in response to the transmission of the source code comprising the activated first code snippet representative of the notification, a request provided by the access device associated with the user to access the network content by way of the network, and
  - providing, in response to the request, the user with subsidized access to the network content in accordance with a rule set associated with the subsidized access arrangement.

15. The system of claim 14, wherein the executable instructions cause the processor to determine that the data usage charge is subsidized by the content provider by:
- recognizing one or more attributes of the network content; and
- determining that the data usage charge is subsidized by the content provider based on the recognized one or more attributes.

16. The system of claim 14, wherein the executable instructions cause the processor to provide the user with the subsidized access to the network content by:
  tracking an amount of data transmitted between the access device and the content provider subsystem while the user accesses the network content; and
  directing the network service provider to adjust the data usage charge in accordance with the tracked amount of data and the rule set associated with the subsidized access arrangement.

17. The system of claim 14, wherein the executable instructions cause the processor to provide the user with the subsidized access to the network content in accordance with the rule set associated with the subsidized access arrangement by utilizing a domain name system ("DNS") server to route data transmitted between the access device and the content provider subsystem through a reverse billing management subsystem while the user accesses the network content.

18. The system of claim 17, wherein the executable instructions cause the processor to further provide the user with the subsidized access to the network content by utilizing the reverse billing management subsystem to:
  track an amount of the data transmitted between the access device and the content provider subsystem while the user accesses the network content; and
  direct the network service provider to adjust the data usage charge in accordance with the tracked amount of data and the rule set associated with the subsidized access arrangement.

19. The system of claim 14, wherein the executable instructions further cause the processor to perform operations comprising:
  detecting that the user has accessed the network content; and
  providing, in response to the detecting that the user has accessed the network content, the user with subsidized access to additional network content in accordance with the rule set associated with the subsidized access arrangement.

20. A non-transitory computer readable medium comprising one or more computer executable instructions that, when executed by a processor, cause the processor to perform operations comprising:
  determining that a data usage charge for access by a user to network content by way of a network provided by a network service provider is subsidized by a content provider in accordance with a subsidized access arrangement between the content provider and the network service provider, the network content associated with a content provider and maintained by a content provider subsystem;
  directing, in response to the determination that the data usage charge is subsidized by the content provider, an access device associated with the user to present a notification indicating that access by the user to the network content is subsidized by the content provider by
    receiving source code associated with the network content and that comprises a first inactive code snippet representative of the notification and a second inactive code snippet including an authentication credential, the first and second inactive code snippets including contents commented out from the source code,
    authenticating the content provider subsystem based on the authentication credential within the second inactive code snippet,
    activating, based on the authenticating of the content provider subsystem, the first inactive code snippet representative of the notification by uncommenting the commented out contents of the first inactive code snippet, and
    transmitting the source code comprising the activated first code snippet representative of the notification to the access device, the notification identifying the network content indicated as being subsidized by the content provider;
  detecting, in response to the transmission of the source code comprising the activated first code snippet representative of the notification, a request provided by the access device associated with the user to access the network content by way of the network; and
  providing, in response to the request, the user with subsidized access to the network content in accordance with a rule set associated with the subsidized access arrangement.

21. The non-transitory computer readable medium of claim 20, wherein the one or more computer executable instructions cause the processor to determine that the data usage charge is subsidized by the content provider by:
  recognizing one or more attributes of the network content; and
  determining that the data usage charge is subsidized by the content provider based on the recognized one or more attributes.

22. The non-transitory computer readable medium of claim 20, wherein the one or more computer executable instructions cause the processor to provide the user with the subsidized access to the network content by:
  tracking an amount of data transmitted between the access device and the content provider subsystem while the user accesses the network content; and
  directing the network service provider to adjust the data usage charge in accordance with the tracked amount of data and the rule set associated with the subsidized access arrangement.

23. The non-transitory computer readable medium of claim 20, wherein the one or more computer executable instructions cause the processor to provide the user with the subsidized access to the network content in accordance with the rule set associated with the subsidized access arrangement by utilizing a domain name system ("DNS") server to route data transmitted between the access device and the content provider subsystem through a reverse billing management subsystem while the user accesses the network content.

24. The non-transitory computer readable medium of claim 23, wherein the one or more computer executable instructions further cause the processor to provide the user with the subsidized access to the network content by utilizing the reverse billing management subsystem to:
  track an amount of the data transmitted between the access device and the content provider subsystem while the user accesses the network content; and
  direct the network service provider to adjust the data usage charge in accordance with the tracked amount of data and the rule set associated with the subsidized access arrangement.

25. The non-transitory computer readable medium of claim 20, wherein the one or more computer executable instructions cause the processor to perform operations further comprising:
   detecting that the user has accessed the network content; and
   providing, in response to the detecting that the user has accessed the network content, the user with subsidized access to additional network content in accordance with the rule set associated with the subsidized access arrangement.

* * * * *